(12) United States Patent
Chevalier, Jr. et al.

(10) Patent No.: US 6,918,285 B2
(45) Date of Patent: Jul. 19, 2005

(54) INDIRECT CONTACT CONTAINER MEASUREMENT

(75) Inventors: Robert A. Chevalier, Jr., Bourne, MA (US); Peter K. Novacon, Osterville, MA (US); Kenneth F. Scussel, East Falmouth, MA (US)

(73) Assignee: Benthos, Inc., North Falmouth, MA (US)

( * ) Notice: Subject to any disclaimer, the term of this patent is extended or adjusted under 35 U.S.C. 154(b) by 0 days.

(21) Appl. No.: 10/770,058

(22) Filed: Feb. 2, 2004

(65) Prior Publication Data

US 2004/0154382 A1 Aug. 12, 2004

Related U.S. Application Data

(60) Provisional application No. 60/445,058, filed on Feb. 5, 2003.

(51) Int. Cl.⁷ .............................. G01M 3/34; G01M 3/00
(52) U.S. Cl. ........................ 73/49.3; 73/45.1; 73/45.4; 73/52
(58) Field of Search ............................ 73/41, 45, 45.1, 73/45.2, 45.4, 52, 49.3

(56) References Cited

U.S. PATENT DOCUMENTS

| 4,800,932 A | 1/1989 | Masuda et al. ............... 141/83 |
| 4,862,732 A | 9/1989 | Raymond et al. ............ 73/45.4 |
| 5,767,392 A | 6/1998 | Belcher et al. ................ 73/41 |
| 6,427,524 B1 | 8/2002 | Raspante et al. ............ 73/45.4 |

*Primary Examiner*—Daniel S. Larkin
(74) *Attorney, Agent, or Firm*—Francis J. Caufield

(57) ABSTRACT

Apparatus and methods for in-line testing of the internal pressure of flexible containers traveling along a production line at high speeds. The apparatus inspects semi-rigid plastic and thin-walled liquid filled containers by analyzing the output from a load cell that indirectly measures the reaction force applied to a container through the intermediary of a load cell roller that, in turn, supports a flexible belt that directly contacts containers while moving them through an inspection station without interrupting the flow of the production line. Containers are contacted only by a flexible portion of a conveyor belt to minimize structural and aesthetic damage to them that might otherwise occur during the inspection process.

20 Claims, 9 Drawing Sheets

INDIRECT CONTACT CONTAINER MEASUREMENT

CROSS REFERENCE TO RELATED APPLICATION

This application claims the benefit of priority from U.S. Provisional Patent Application No. 60/445,058 filed Feb. 5, 2003 in the names of Robert A. Chevalier, Jr., et al. with the title INDIRECT CONTACT CONTAINER MEASUREMENT, the entire contents of which is incorporated herein by reference.

BACKGROUND OF THE INVENTION

In general, this invention relates to apparatus and methods for testing flexible containers traveling at high speed on a production line. More specifically, the invention relates to apparatus and methods for testing the internal pressure, fluid tightness and/or seal integrity of containers by indirect contact and especially, but not exclusively, is intended for use in testing flexible walled containers made of plastic and/or thin-walled metals.

In many industries, it is important to test for internal pressure, fluid tightness and/or seal integrity. In the beverage industry, for example, it is essential to assure that containers in which beverage products reside are completely sealed to assure that their contents are in good condition, free from molds, bacteria and other pathogenic organisms so that they will be safe when used by consumers. The pharmaceutical industry similarly requires that containers for medications, especially solutions intended for injection or intravenous administration, be protected from contamination or serious danger to public health may result. Similar considerations apply to the food industry, as well, where food products are delivered in sealed, flexible-walled containers.

In the beverage industry, it is also common practice to place metered doses of carbon dioxide or liquid nitrogen in containers immediately prior to or contemporaneous with their sealing to increase their internal pressure as an means of enhancing their stiffness, thereby reducing material costs while still providing filled containers possessing acceptably robust structural integrity so that they can withstand the rigors of handling, packing, and shipment.

Because fluid tightness and seal integrity of containers is not readily ascertained by visual inspection, various attempts have been made to provide apparatus for testing for these properties. For example, U.S. Pat. No. 4,862,732 describes a "squeezing apparatus" for testing the fluid tightness and/or seal integrity of plastic bottles, such as those in which laundry detergents are commonly sold. This apparatus creates a pressure within the bottle by squeezing it by means of a pneumatic cylinder. It monitors the position of the piston of this cylinder. If the bottle does not leak, the piston stops as soon as the pressure in the bottle increases enough to balance the force of the piston. After equilibrium, continued pressure caused by the squeezing diminishes as pressurized gas within the bottle leaks by being forced through a leak hole, and thus the piston of the pneumatic cylinder moves further than in the case of a non-leaking bottle.

U.S. Pat. No. 5,767,392 to William David Belcher, et al. issued on Jun. 16, 1998 describes a method and apparatus for leak testing a closed container by applying a compressive force to the container, releasing the compressive force, and measuring the recovery of the container a predetermined time after the compressive force is released. The recovery is correlated with the presence or absence of leaks. The Belcher, et al. patent appears to suffer from the inability to cope with variations in container temperature and physical properties of the container and its contents.

U.S. Pat. No. 4,800,932 to Masayuki Masuda, et al. issued on Jan. 31, 1989 describes an apparatus for determining internal pressure of a filled can by measuring the reaction force from the can as it is passed between back up and measurement rollers, at least one of which is crowned.

U.S. Pat. No. 6,427,524 issued to Frank Raspante, et al. on Aug. 6, 2002 describes apparatus and methods for in-line testing for leaks in flexible containers traveling along a production line at high speeds through the use of multiple sensors spaced at fixed displacements along a compression section.

In spite of the variety of approaches in the art, there remains a need to be able to measure containers without inflicting structural or aesthetic damage to them as a result of the measurement process, and it is a primary object of this invention to satisfy that need.

It is another object of the present invention to provide high-speed apparatus and methods for assessing the internal pressure of containers without removing them from a production line.

It is another object of the present invention to provide apparatus and methods for in-line leak testing of flexible containers while automatically compensating for container to container variations in temperature and physical properties.

It is another object of the present invention to provide in-line apparatus and methods for testing containers for seal integrity.

It is yet another object of the present invention to provide apparatus and methods for in-line testing of containers while generating statistical data for process control and quality assurance purposes.

It is yet another object of the present invention to provide apparatus and methods for in-line testing of containers to provide feedback signals for control of upstream production apparatus.

Other objects of the invention will, in part, be obvious and will, in part, appear hereinafter when the description to follow is read in conjunction with the drawings.

SUMMARY OF THE INVENTION

A free-standing, self-contained apparatus and related method that can be readily integrated with a container production line to measure the internal pressure of plastic or thin-walled metal containers using at least one load cell sensor that is mounted behind a conveyor belt so that it does not directly contact the containers thereby substantially eliminating container structural and aesthetic damage while the containers pass through a measurement station. The conveyor belt preferably is provided with a tacky surface to support the containers past load cell rollers. The load cell rollers are placed behind at least one of the conveyor belts to eliminate any damage to the containers as they pass through an inspection load cell station. The speed of the inspection belts is synchronized to the container transportation conveyor of a manufacturing line to provide smooth bottle inspection without tipping the container over or slowing the manufacturing line. The inspection conveyor belts are adjustable in width and height to accommodate quick production changeover from one product size to another.

The internal pressure of the container is transferred through the conveyor belt to one or more pairs of load cell rollers, preferably one, which are connected to a load cell bridge. The electrical output of the load cell bridge is conditioned for both gain and offset and then sent to an A/D converter located on a data signal processor (DSP) board. The digital signal is then processed to preferably find the maximum peak voltage which is proportional to the internal pressure in the container. This peak voltage is then scaled and a relative merit value is assigned to that container. The assigned merit value is then compared against user set rejection limits. If the merit value is outside upper or lower reject limits, then that container is removed from the manufacturing line transportation conveyor by a reject system.

The relative merit value can used as a feedback value to an upstream pressure dosing system, or the like, to make near real time adjustments to the dosing process. This feedback value can be supplied to the pressure dosing system by any suitable communications port, such as a serial port.

An operator interface is preferably provided via a computer operating with a graphical user interface and equipped with software to permit setup, control data processing and collection, set and monitor acceptance limits, access manufacturing trends, perform control functions, and collect and display historical statistical data.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral and/or label that identifies it wherever it appears in the various drawings and wherein.

DETAILED DESCRIPTION OF THE INVENTION

Figure 1:
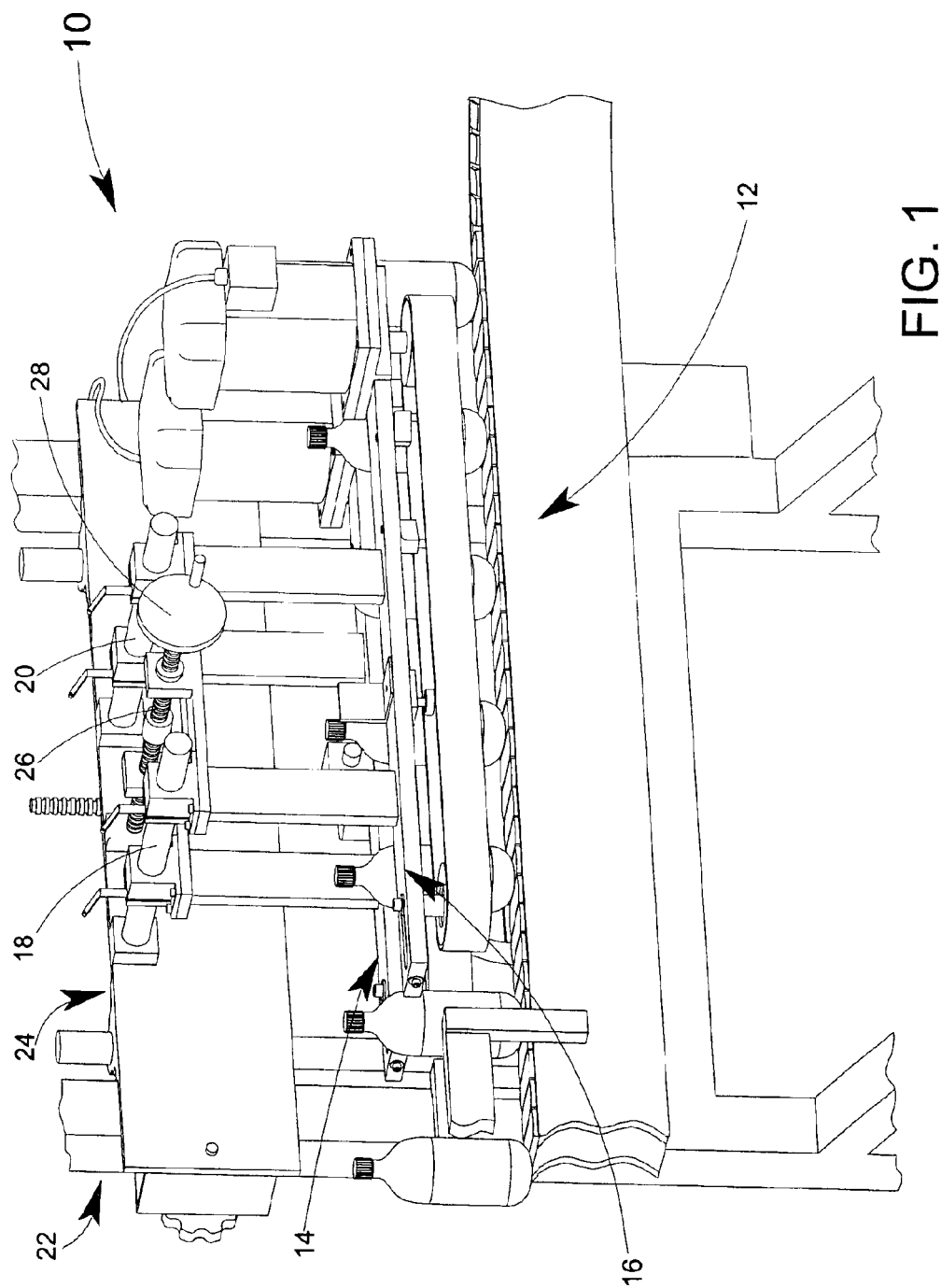
FIG. 1 is a perspective view of the apparatus of the invention positioned over a portion of a conveyor for transporting containers along a production line as they undergo various manufacturing and testing operations.

Reference is now made to FIG. 1 which shows the invention as a free-standing, self-contained apparatus or system 10 that is readily integratable with container production lines such as that designated generally at 12. System 10, and its associated methodology, is adapted to measure the internal pressure of liquid filled, plastic or thin-walled metal containers using at least one load cell sensor that is mounted behind a conveyor belt so that it does not directly contact the containers thereby substantially eliminating container structural or aesthetic damage while the containers pass through a measurement station. It will be understood that the liquid occupying a container need not completely fill it, and containers filled solely with a pressurized gas may also be tested along with those containing gels and solid-liquid mixtures, and the like.

As seen in FIG. 1, system 10 comprises support frame 22 that is generally L-shaped having a base section with adjustable leveling feet and a vertical section that supports a conveyor assembly carriage 24. Mounted to the conveyor assembly carriage 24 are a pair of spaced apart conveyor assemblies 14 and 16. The conveyor assemblies 14 and 16 are mounted to the conveyor assembly carriage 24 via horizontally mounted cantilevered rods 18 and 20. The spacing between conveyor assemblies 14 and 16 may be adjusted to accommodate different sized containers through the use of a spacing screw 26 that is operated by turning a spacing adjustment wheel 28. In this connection, spacing screw 26 is provided with two screw sections that are oppositely threaded while one of them is connected to conveyor assembly carriage 24 at its root by a slip joint so that both conveyor assemblies 14 and 16 move toward and away from one another by equal amounts as spacing adjustment wheel 28 is rotated.

Figure 2:
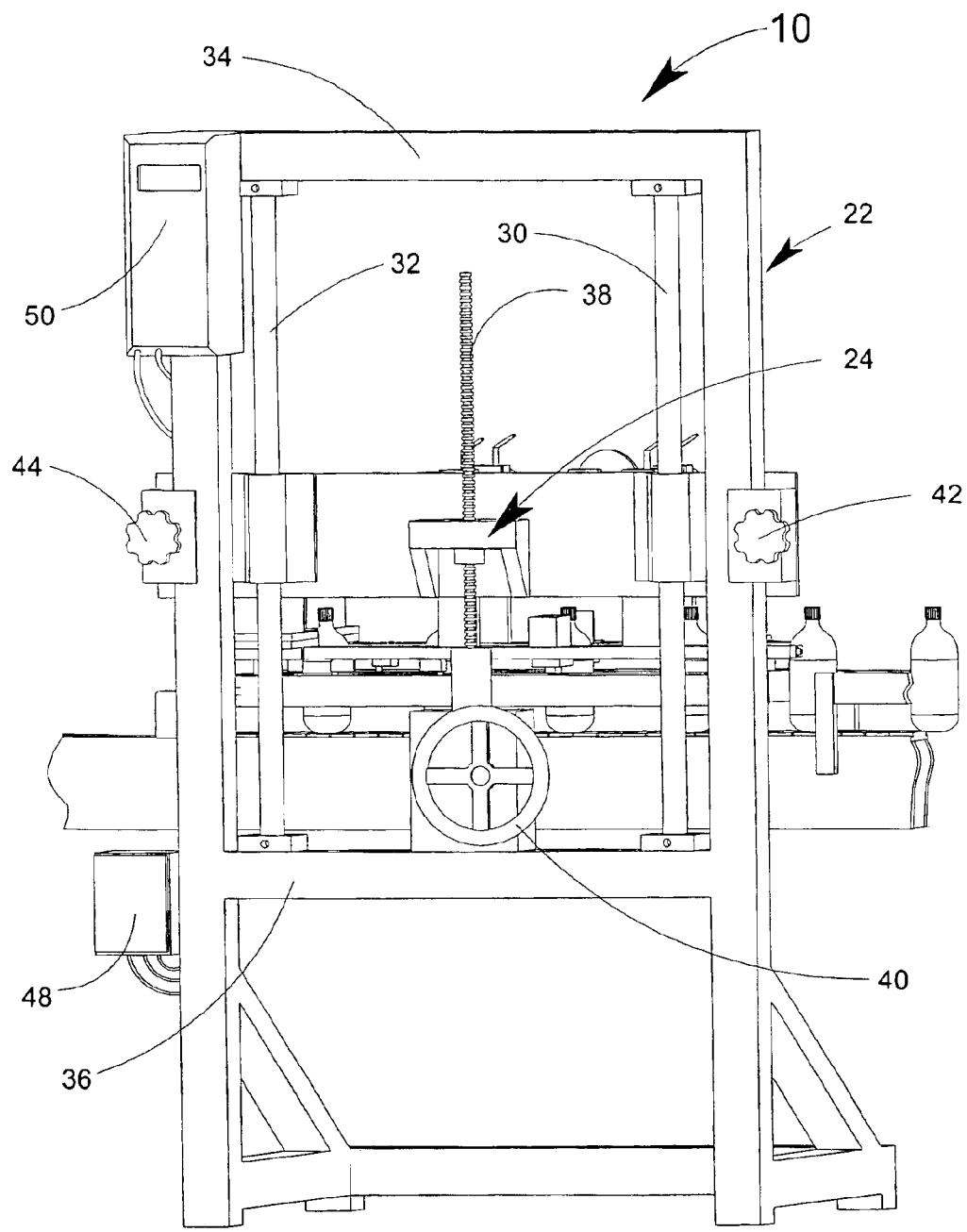
FIG. 2 is a perspective view of the rear of the apparatus of FIG. 1 taken from the point of view of an operator.

The vertical height of conveyor assemblies 14 and 16 may also be adjusted to accommodate containers of different height by moving conveyor assembly carriage 24 up and down. This is best seen by now referring to FIG. 2 showing conveyor assembly carriage 24 slidably mounted to a pair of vertically extending carriage guide rods 30 and 32 that are, in turn, fixedly mounted between a pair of horizontally oriented cross members 34 and 36 that form part of the vertically extending section of support frame 22. As seen in FIG. 2, a height adjust threaded rod 38 passes through a flanged portion of conveyor assembly carriage 24 and turns in response to turning a height adjustment wheel 40. Height locking knobs 42 and 44 are provided to release conveyor assembly carriage 24 so that its height may be changed and to lock it in place after adjustment to the desired height has been completed.

Also seen in FIG. 2, the rear of system 10, is a motor speed controller 50 for adjusting the speed of a pair of drive motors 80 and 82 (See FIG. 4.), and a junction box 48 that serves as a common point for connecting a variety of system 10's electrical subsystems, including controllers and data processing components.

Figure 3:
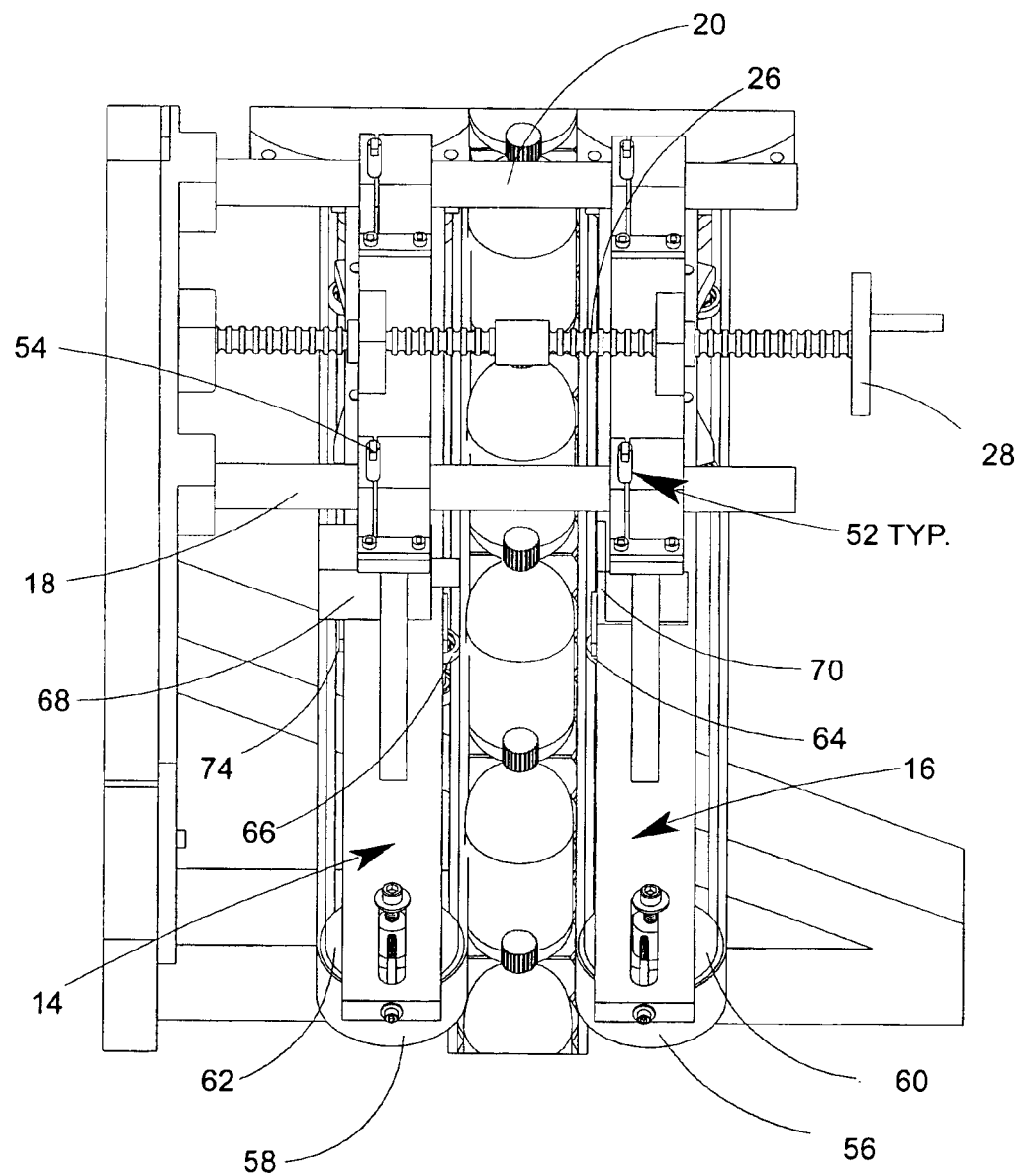
FIG. 3 is a perspective view looking down at the apparatus from the in feed end showing a series of containers as they pass through the apparatus to undergo testing.

Reference is now made to FIG. 3, which is a perspective view looking down at system 10 from its in feed end. FIG. 3 shows a series of containers to be tested as they pass through system 10. As seen in FIG. 3, the containers, which may be liquid filled PET bottles as shown or thin-walled metal cans, are passed through system 10 by a pair of spaced apart rotating conveyor belts 56 and 58 that form part of conveyor assemblies 16 and 14, respectively. Conveyor belts 56 and 58 are nominally parallel but one of them is intentionally set slightly into the path of travel of containers as explained more fully hereinafter. At the in-feed end of system 10, conveyor belts 56 and 58 are supported by idler wheels 60 and 62 that are mounted for movement with respect to their corresponding conveyor assemblies so that the tension in conveyor belts 56 and 58 may be adjusted as needed. Conveyor belt 58 is supported at a measurement station by a pair of backing, vertically spaced apart load cell rollers 66 and opposite that, behind conveyor belt 56, are a pair of vertically spaced apart anvil rollers 64. The center lines of load cell rollers 66 and anvil rollers 64 are arranged along a line nominally perpendicular to the path of containers tracking along the production line 12. Load cell rollers 66 are connected to a load cell 74 in a manner to be described. A phototrigger sensor 68 and trigger reflector 70 are arranged to detect the presence of a container proximate the measurement station. Phototrigger sensor 68 and trigger reflector 70 are held in place by supports 94 and 98 (shown in FIG. 5), respectively. The phototrigger sensor 68 is connected to a phototrigger cable (not shown) to pass signals to a digital signal processor board (See 104 in FIG. 6) indicating when load information is to be read.

Conveyor belt assemblies 14 and 16 are slidably mounted to horizontal guide rods 18 and 20 via typical guide blocks 52 TYP each of which is provided with locking knobs 54 to fix these assemblies in place once adjusted by spacing adjustment screw 26. In this connection, the oppositely threaded sections of spacing adjustment screw 26 are connected via a well-known universal joint.

Figure 4:
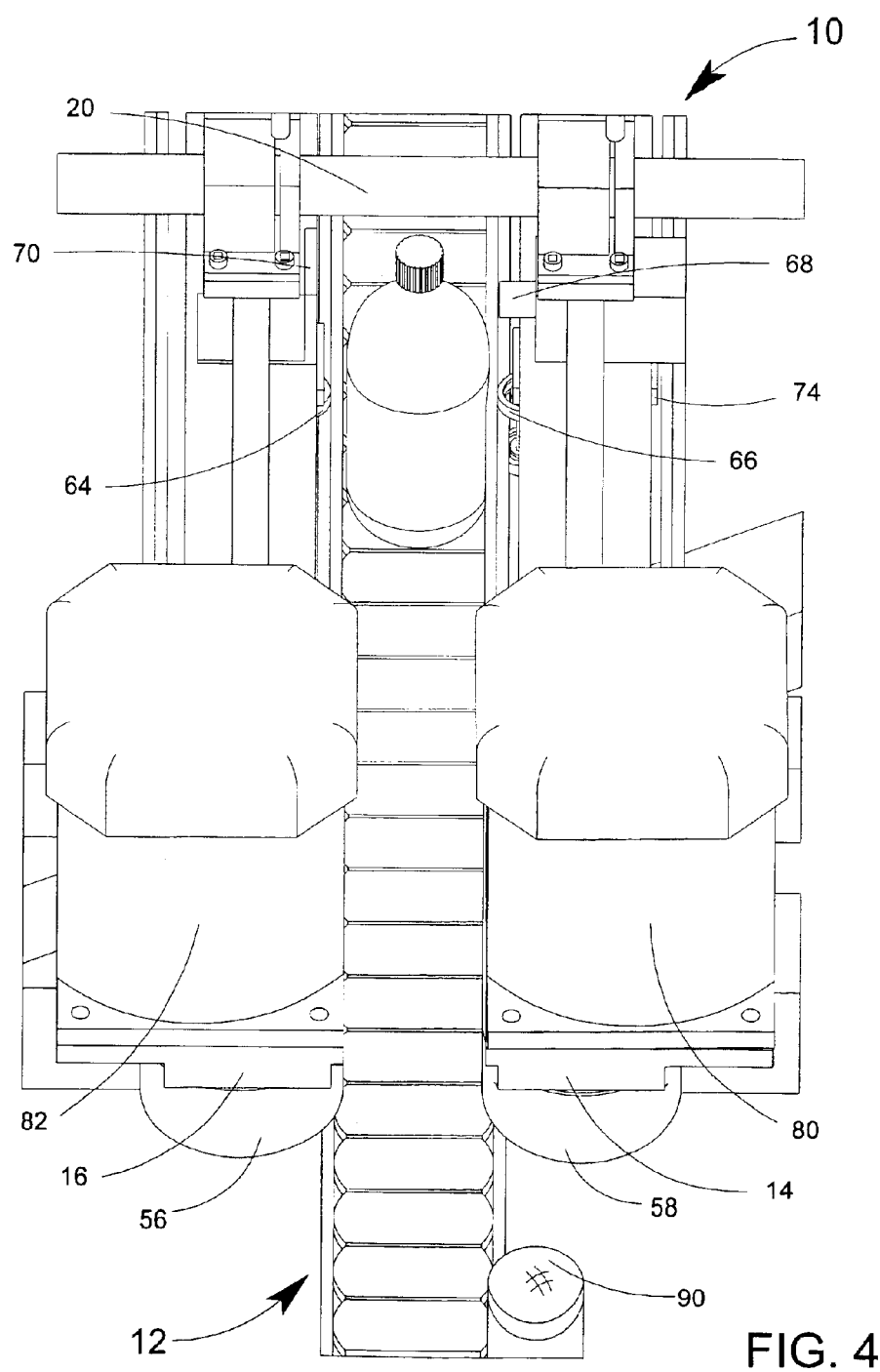
FIG. 4 is a perspective view of the apparatus looking at it from its exit end along with a container that is just passing by a measurement station, the view also showing transport belt assembles along with motors that drive sprockets that in turn drive the transport belts associated with each motor.

Reference is now made to FIG. 4 which is a perspective view of system 10 looking at it from its exit end. Shown in FIG. 4 is a container that is just passing by the measurement station. A pair of drive motors 80 and 82 are provided to drive conveyor belts 58 and 56. To accomplish this, motors 80 and 82 are connected with drive wheels 84 and 86 (shown in FIG. 6) that in turn are in friction contact with conveyor belts 58 and 56, respectively. The speed of conveyor belts 56 and 58 are synchronized to the container transportation conveyor 12 of a manufacturing line to provide smooth container inspection without tipping containers over or slowing the manufacturing line.

Figure 5:
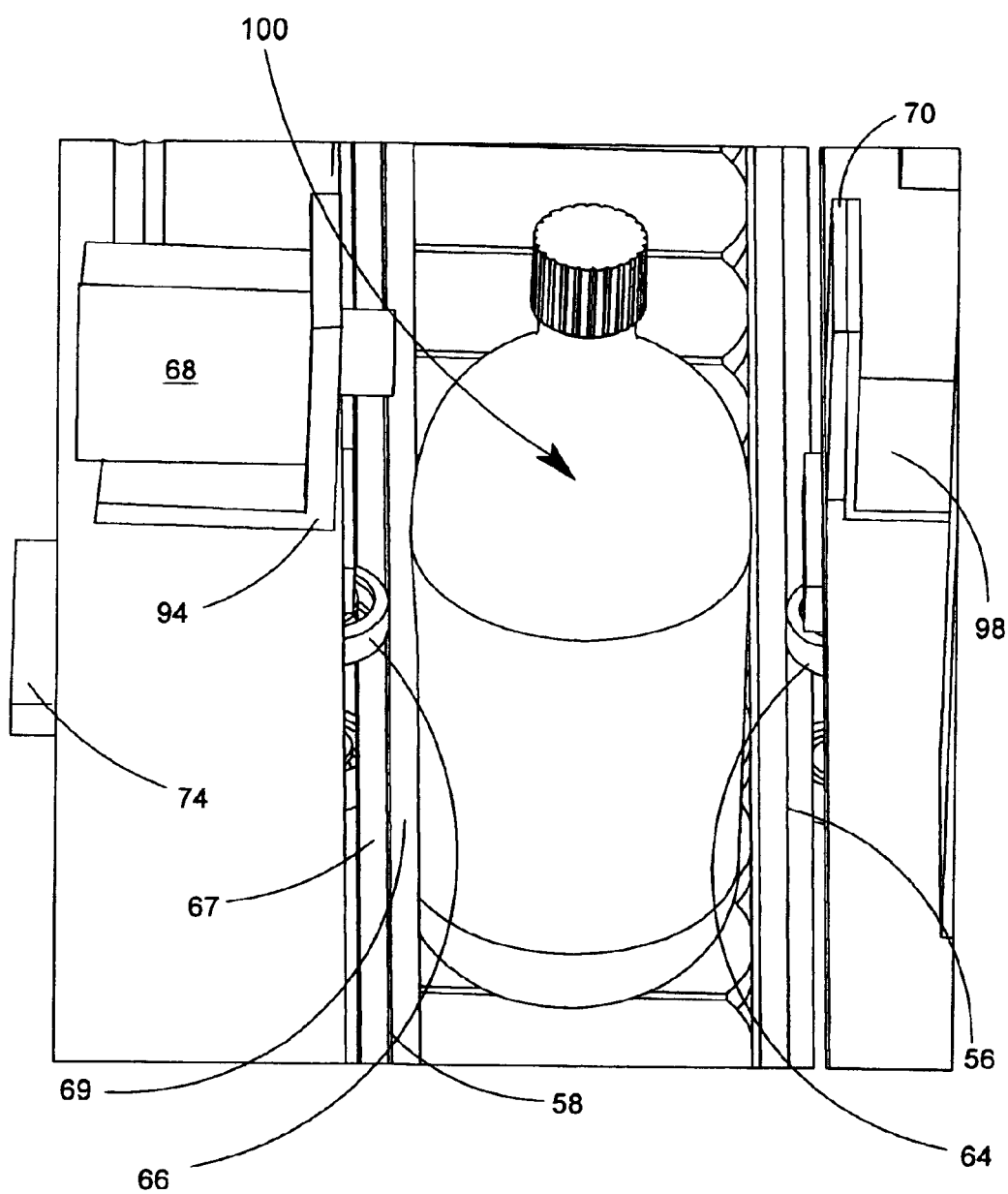
FIG. 5 is a close-up perspective view looking at a container located proximate the measurement station of the apparatus as it is traveling downstream toward the exit end of the apparatus.

Reference is now made to FIG. 5, which is a close-up perspective view looking at a typical substantially liquid filled container 100 made of plastic and provided with a sealed screw cap. Container 100 is shown located proximate the measurement station of system 10 while traveling downstream toward its exit end. As seen here and in FIG. 7, conveyor belts 56 and 58 are preferably identical composite structures comprising two sections of different materials that are bonded together at a common interface. Directly contacting containers 100 is a flat flexible section 69 preferably made of a synthetic rubber such as that marketed under the tradename Linatex, or the like, and a relatively less flexible backing section 67 that nests between load cell rollers 66 and anvil rollers 64 and carries the tension forces generated by drive motors 80 and 82. The synthetic rubber sections 69 of conveyor belts 56 and 58 are chosen along with the spacing between conveyor belt assemblies 14 and 16 so that sensible force readings on load cell 74 may be obtained without inflicting structural or aesthetic damage to the containers as they pass through system 10. Sensible force readings will take into account desired lower and upper figures of merit along with force resolution requirements of a particular production environment. The material composition of the belts is preferably such that the belt surface directly contacting containers is slightly tacky to promote enhanced gripping ability.

Thus, the conveyor belts are preferably provided with a tacky surface to support the containers past load cell rollers. The load cell rollers are placed behind at least one of the conveyor belts to eliminate any damage to the containers as they pass through an inspection load cell station. The speed of the inspection belts is synchronized to the container transportation conveyor 12 of a manufacturing line to provide smooth bottle inspection without tipping the container over or slowing the manufacturing line. The inspection conveyor belts are adjustable in width and height to accommodate quick production changeover from one product size to another.

Figure 6:
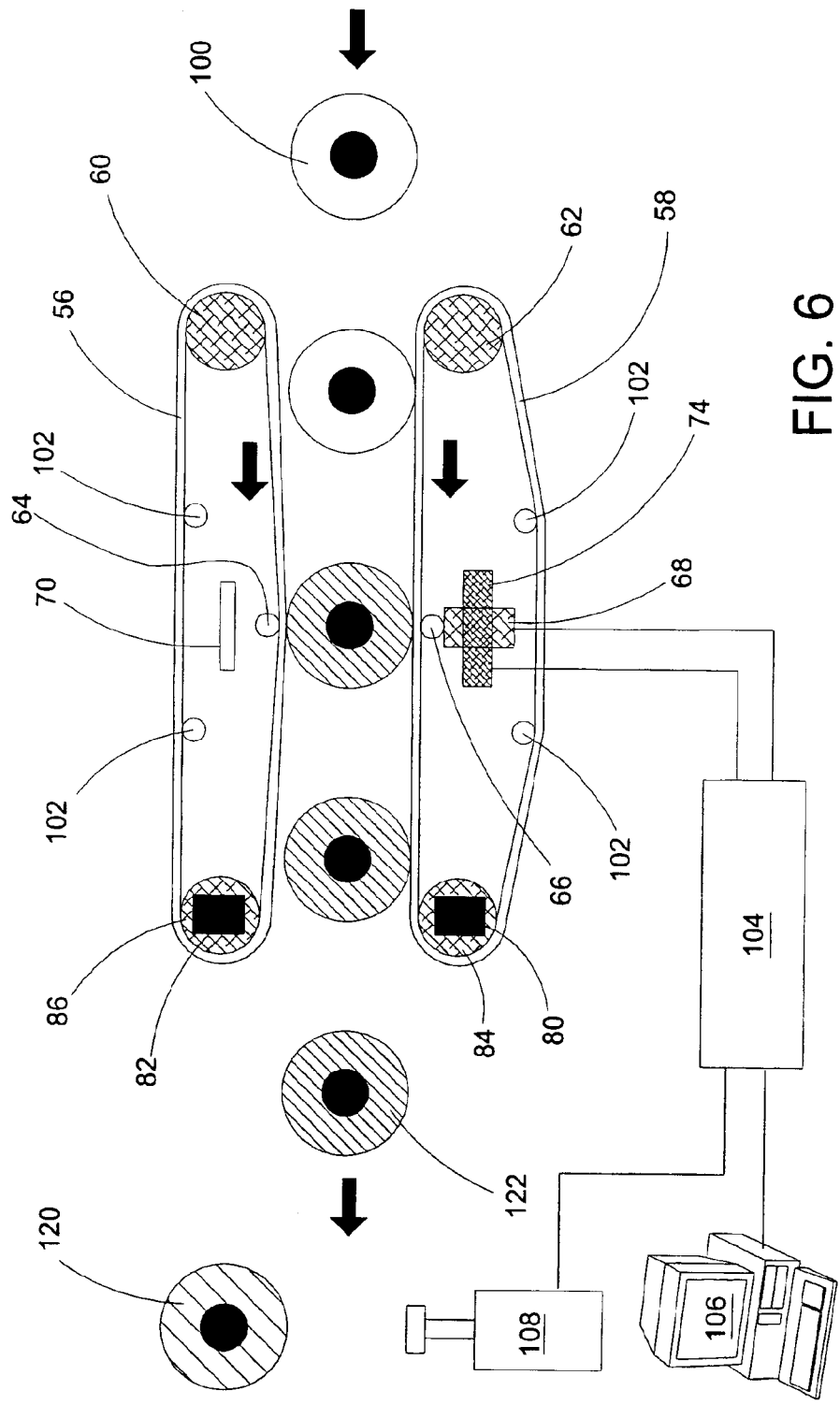
FIG. 6 is a diagrammatic top view of the apparatus illustrating its major components in association with containers that are tested as they travel along a production line.

Referring now to FIG. 6, a diagrammatic top view of system 10 is shown illustrating its major components in association with containers that are tested as they travel along production line 12. As seen here, anvil rollers 64, which are positioned directly opposite load cell rollers 66, are positioned to protrude slightly into the path of travel of oncoming containers so that the containers are gently squeezed by the synthetic rubber section of conveyor belts 56 and 58 along a path of travel that gradually decreases in width until the midpoint of a container is nominally in line between anvil and load cell rollers after which the spacing gradually increases again. During this process, the reaction load of the container is transferred to load cell 74 through the intermediary of the flexible portion 69 of conveyor belt 58. Notice that neither anvil rollers 64 nor load cell rollers 66, which are made of metal, directly contact a container. Instead, the containers are contacted only by the relatively wider and more flexible planar section 69 of conveyor belts 56 and 58. Thus, containers are gently and gradually squeezed and released as they approach and leave the measurement station and are never directly contacted by hard rollers that may otherwise damage them.

Belt tension rollers shown typically at 102 (see also FIG. 7) provide further support to conveyor belts 56 and 58 to maintain the integrity of the geometry of the measurement path. The trigger photosensor 68 in conjunction with the trigger reflector 70 operate to detect the presence of a container proximate the measurement station. Signals from the trigger photosensor 68 and load cell 74 are fed to a digital signal processor board 104 that is configured to collect and analyze data. Digital signal processor board 104 also is connected to a rejecter system 108 and is configured to provide reject signals to system 108 when a reject container is detected so that the rejecter system 108 can remove it from production line 12. Low pressure container 120 is shown separated by rejector system 108 from path of normal pressure container 122.

A computer 106 may be integrated with system 10 and be provided with suitable software to facilitate data processing and analysis, provide a graphical user interface for an operator, display, print and store data and perform general housekeeping functions. In this connection, it will be recognized that computer 106 may take on the functions of digital signal processor board 104 when its software is appropriately configured and a suitable interface board is provided.

Figure 7:
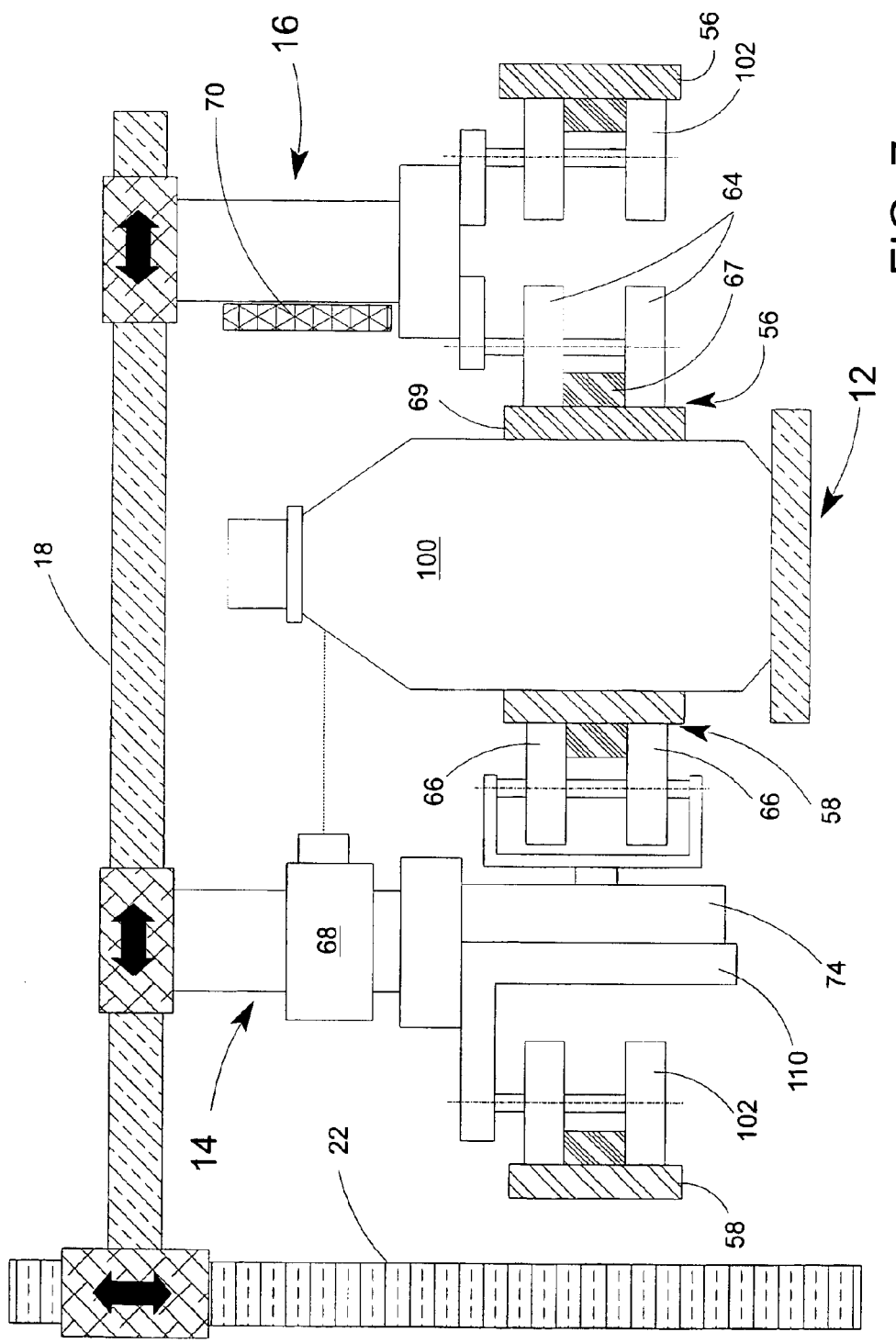
FIG. 7 is a diagrammatic elevational view of the measurement station of the apparatus along with a container that is being measured.

Reference is now made to FIG. 7 which is a diagrammatic elevational view of the measurement station of the apparatus along with a container 100 that is in place in the measurement station between load cell rollers 66 and anvil rollers 64. As seen, load cell rollers 66 are connected to load cell sensor 74 via a rigid rectangular frame and connecting rod. Load cell sensor 74 is in turn connected in conveyor assembly 14 via a load cell mounting bracket 110. It will be appreciated that any moments that may be induced in the rigid frame supporting the load cell rollers 66 may be mechanically decoupled from load cell sensor 74 by intervening suitable mechanical relief mechanisms.

Phototrigger sensor 68 generates a preferably polarized beam that ordinarily is retroreflected by trigger reflector 70 when no portion of a container is present to interrupt it. However, when any portion of a container interrupts the beam, a signal is generated to alert the digital signal processor 104 that a container is present and data is to be collected. The beam is preferably polarized to avoid passing light straight through containers that may be transparent to it at its operating wavelength.

Figure 8:
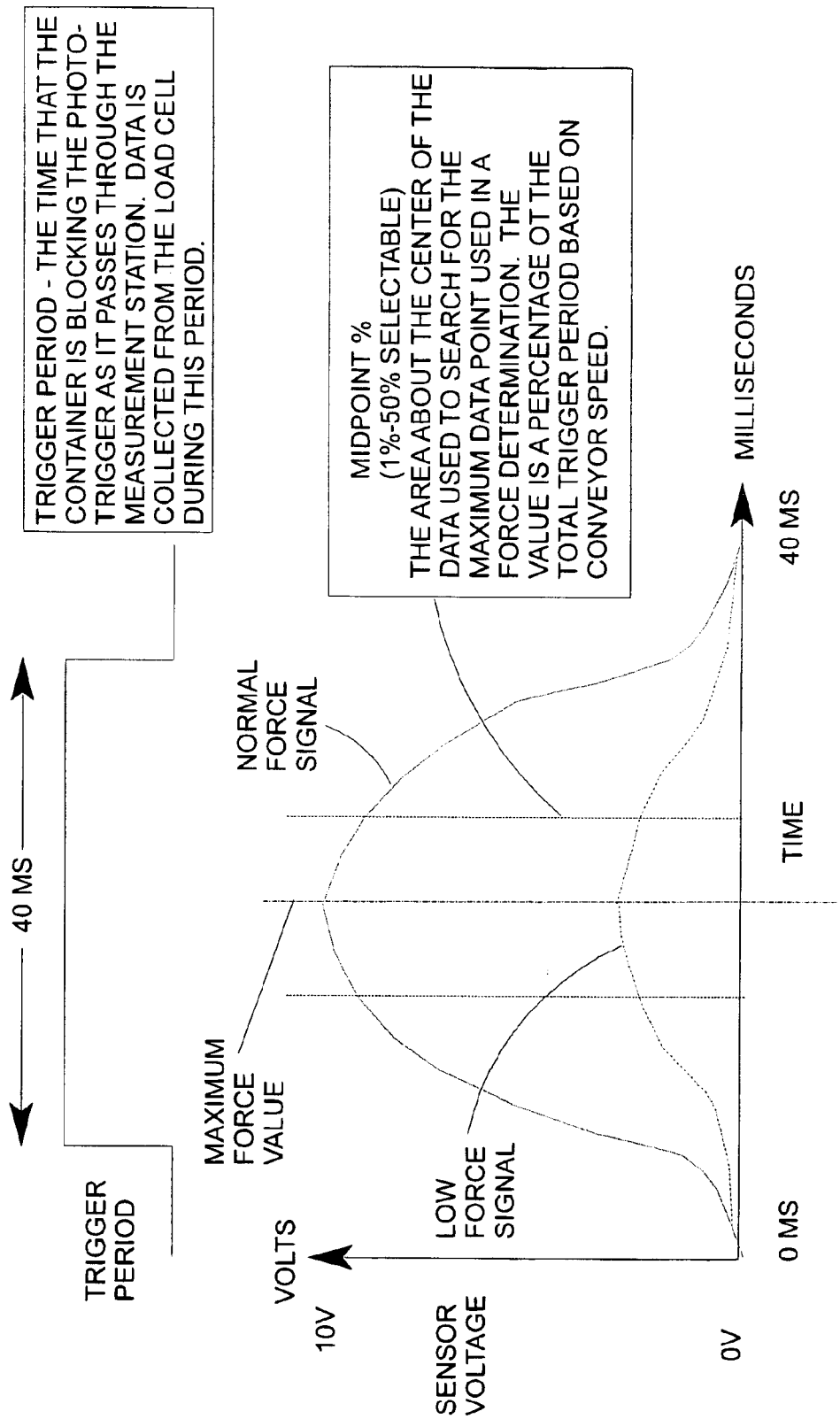
FIG. 8 is a diagrammatic graph illustrating load cell response curves for normal and low pressure containers along with illustrations of a trigger period and Midpoint %.

Reference is now made to FIG. 8 which is a diagrammatic graph illustrating load cell response curves for normal and low pressure containers along with illustrations of a "Trigger Period" and "Midpoint %". As seen in FIG. 8, load cell 74 generates an output voltage proportional to the force transferred to it via the intervening conveyor belt, load cell rollers and support frame. Because the conveyor belt is at least in part flexible, the effect on the output of any moments that are created by tilted containers is believed to be minimized.

The load cell 74 is configured to normally continuously output data but that data is sampled only during the Trigger Period defined as the time a container is blocking the phototrigger sensor 68 as a container passes through the measurement station. A typical Trigger Period may be, for example, 40 milliseconds while typical conveyor speeds may be, for example, 300 feet per minute. Obviously, the Trigger Period may be adjusted by changing the height at which the photo trigger sensor beam strikes a container.

FIG. 8 shows typical force signals for a normal container and a container with low internal pressure. Both curves have a characteristic shape that is in form bell shaped, gradually increasing, then rising along a more or less straight slope to a transition region where the slope decreases until a maximum or peak is reached. After the maximum, the remainder of the curve is nominally the mirror image of its transit to maximum, although in practice there may be some asymmetries encountered.

The gradual increases and decreases at the beginning and end of the force curves correspond to the gradual and gentle squeezing and relaxation regions provided by the spaced apart conveyor belts 56 and 58, and thus, their characteristic shape evidences that containers are subjected to low impact forces while they are being measured as they are being transported along production line 12.

As can be appreciated, the internal pressure of a container is transferred through a conveyor belt to one or more load cell rollers, preferably one, which is connected to the load cell bridge. The electrical output of the load cell 74 is conditioned for both gain and offset and then sent to an A/D converter located on data signal processor (DSP) board 104. The digital signal is then processed to preferably find the maximum peak voltage which is proportional to the internal pressure in the container. The peak voltage of a force curve is determined from the collected data resident within a "Midpoint %" defined as a percentage of the total Trigger Period and is based on production conveyor speed. This peak voltage is then scaled and a relative merit value is assigned to a container. The assigned merit value is then compared against user set rejection limits. If the merit value is outside upper or lower reject limits, then that container is removed from the manufacturing line transportation conveyor by rejecter system 108.

The relative merit value can used as a feedback value to an upstream $CO_2$ or liquid nitrogen dosing system to make near real time adjustments to the dosing process. This feedback value can be supplied to the pressure dosing system by any suitable communications port, such as a serial port.

Figure 9:
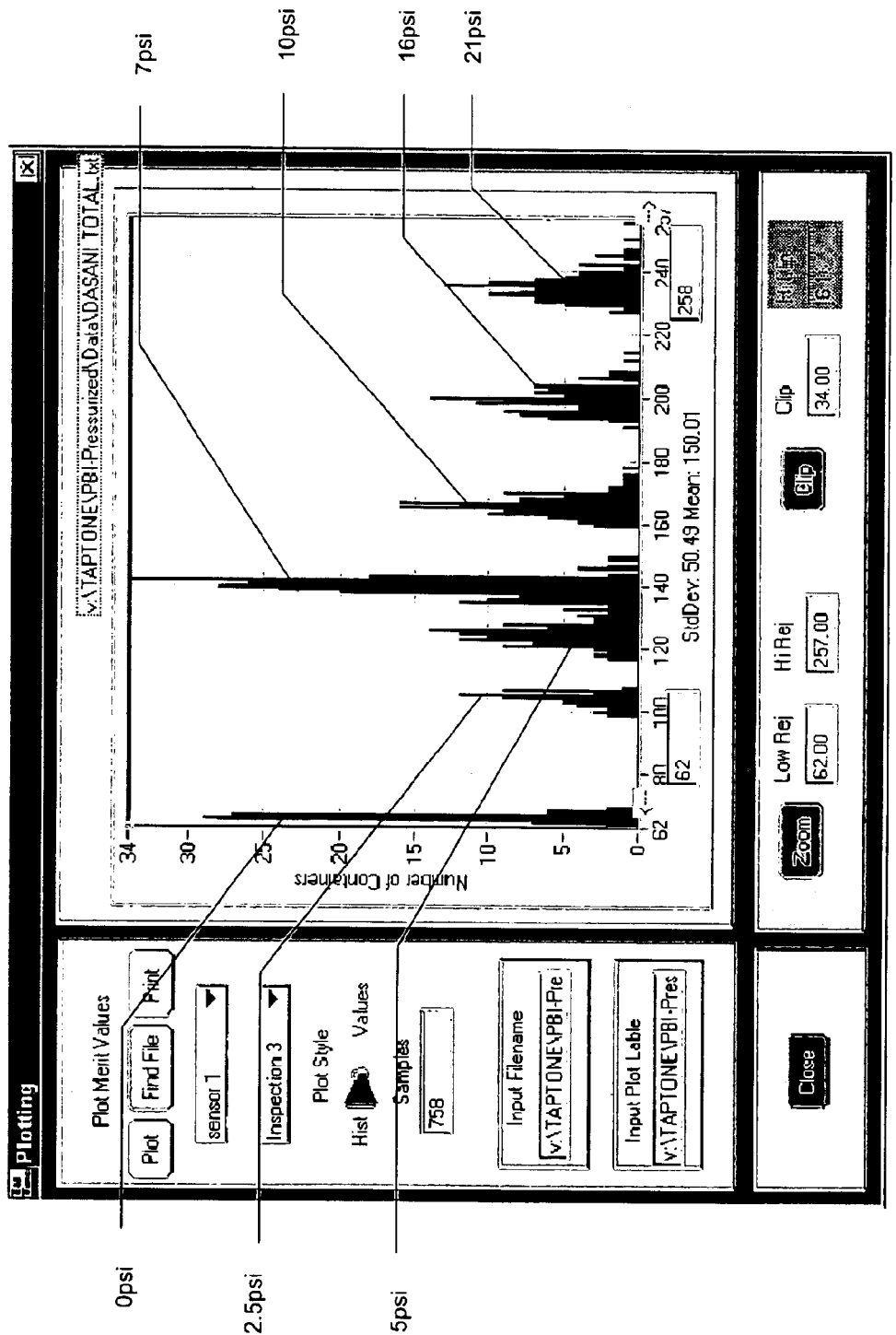
FIG. 9 is a diagrammatic computer screen display showing a representation of statistical measurement data taken on a series of containers.

Reference is now made to FIG. 9. FIG. 9 is a diagrammatic representation of typical statistical measurement data displayed on a computer screen. As can be seen, container internal pressure can be made to correlate with corresponding measurement levels, upper and lower merit levels can be set to represent accept/reject levels, and clip levels can be selected to ignore values exceeding a certain limit. Alternatively, individual container curves may be displayed directly while statistics are being collected and processed in the background by DSP 104 and/or computer 106.

An operator interface is preferably provided via computer 106 operating with a graphical user interface and equipped with software to permit setup, control data processing and collection, set and monitor acceptance limits, access manufacturing trends, perform control functions, and collect and display historical statistical data.

While only one load cell has been shown as a preference, it will apparent to those skilled in the art that more than one load cell may be beneficially used to generate information about container pressures and other properties. In addition, it will be apparent that other characteristics of the load cell force curves may be exploited as an adjunct to determining the acceptability of container performance. It will also be apparent that a number of mathematical algorithms may be used to calculate the maximum value. Preferred here is one of simply comparing sampled values during the Midpoint % and storing the maximum.

Based on the teachings of the invention, other embodiments of the invention will occur to those skilled in the art and are intended to fall within the scope of the invention as set forth in the claims.

What is claimed is:

1. An apparatus for testing flexible containers, said apparatus comprising:

a pair of spaced apart continuous loop belts in line with a production line, each of said continuous loop belts having at least one flexible section for directly contacting and gradually applying and removing a predetermined compression over a predetermined time to a plurality of containers as they travel by an inspection station arranged along said continuous loop belts;

at least one sensor in contact with at least one of said belts on a side opposite to that of said belt in direct contact with a container while a container is in said inspection station, said sensor being arranged to sense the force transferred from a container to said sensor through said belt so that said sensor does not directly contact containers and damage them, said sensor generating a signal that varies in accordance with the internal pressure of said containers as they pass by said sensor; and means for receiving said signals from said sensor and analyzing them to determine the acceptability of the internal pressure of the containers.

2. The apparatus of claim 1 wherein said in-line pair of spaced apart continuous loop belts are arranged to hold said plurality of containers therebetween and to move said plurality of containers along said production line without interrupting their flow while applying said predetermined compression to said plurality of containers.

3. The apparatus of claim 2 further comprising adjustment means for adjusting the spacing between said continuous loop belts to allow said apparatus to operate on containers of differing sizes.

4. The apparatus of claim 2 wherein said continuous loop belts have a composite structure comprising one flexible section for directly contacting containers and one relatively inflexible section for carrying tension loads applied to said belts to drive them.

5. The apparatus of claim 4 wherein said flexible section of said belts comprises synthetic rubber.

6. The apparatus of claim 1 wherein said sensor comprises at least one load cell roller that directly contacts a belt on the side opposite its side contacting a container and a load cell directly in contact with said roller so that loads imposed on said roller from a container through said belt are directly transferred to said load cell.

7. The apparatus of claim 1 further comprising container detection means for detecting when one of said plurality of containers is in a predetermined position with respect to said sensor.

8. The apparatus of claim 7 wherein said container detection means comprises a light source arranged to generate light and direct a beam of light towards said containers, and light detection means arranged to detect when said beam is interrupted by, or reflected from, a container.

9. The apparatus of claim 1 wherein said receiving and analyzing means is arranged to detect, in the response from said sensor, the peak pressure generated within each container caused by said predetermined compression and to measure the pressure within said container at a number of points on each side of the peak pressure.

10. The apparatus of claim 9 wherein said receiving and analyzing means is arranged to generate an output signal if said peak pressure generated within each container lies outside a predetermined range.

11. The apparatus of claim 1 having the form of a mobile unit capable of being added to an existing production line, said apparatus having a support means capable of supporting said continuous loop belts and said at least one sensor separately from said production line.

12. A method for testing flexible containers as they travel along a production line, said method comprising:

applying a predetermined compression to a plurality of containers as they travel along said production line;

while said predetermined compression is applied to each container, indirectly contacting said container with at least one sensor to generate responses that vary in accordance with the internal pressure of the container at it passes by said sensor; and analyzing said responses to determine the internal pressure in the containers.

13. The method of claim 12 wherein said predetermined compression is applied by two nominally parallel movable members spaced apart from one another and arranged to hold said plurality of containers therebetween, and to move said plurality of containers along said production line without interrupting their flow while applying said predetermined compression.

14. The method of claim 13 wherein the spacing between said movable members is adjustable to allow the apparatus to operate on containers of differing sizes.

15. The method of claim 14 wherein said movable members have the form of endless belts.

16. The method of claim 15 wherein the surfaces of said endless belts which contact said plurality of containers are substantially planar and flexible.

17. The method of claim 12 further comprising detecting when one of said plurality of containers is in a predetermined position with respect to said sensor.

18. The method of claim 17 wherein said detection of said container is effected by directing a beam of light towards a container, and detecting when said beam is interrupted by, or reflected from, a container.

19. The method of claim 12 comprising detecting, in the response from said sensor, the peak pressure generated within each container caused by said predetermined compression, and measuring the pressure within said container at a number of points on each side of the peak pressure.

20. The method of claim 19 further comprising generating an output signal if said peak pressure generated within each container lies outside a predetermined range.

* * * * *